（12） United States Patent
An

(10) Patent No.: US 11,965,371 B2
(45) Date of Patent: Apr. 23, 2024

(54) VEHICLE AND CONTROL METHOD THEREOF

(71) Applicants: HYUNDAI MOTOR COMPANY, Seoul (KR); KIA CORPORATION, Seoul (KR)

(72) Inventor: Daeyun An, Anyang-si (KR)

(73) Assignees: Hyundai Motor Company, Seoul (KR); Kia Corporation, Seoul (KR)

( * ) Notice: Subject to any disclaimer, the term of this patent is extended or adjusted under 35 U.S.C. 154(b) by 447 days.

(21) Appl. No.: 17/337,243

(22) Filed: Jun. 2, 2021

(65) Prior Publication Data

US 2022/0056749 A1 Feb. 24, 2022

(30) Foreign Application Priority Data

Aug. 18, 2020 (KR) ........................ 10-2020-0103494

(51) Int. Cl.
*E05F 15/40* (2015.01)
*B60J 5/10* (2006.01)
*B60R 25/01* (2013.01)
*B60R 25/24* (2013.01)

(52) U.S. Cl.
CPC ............... *E05F 15/40* (2015.01); *B60J 5/101* (2013.01); *B60R 25/01* (2013.01); *B60R 25/24* (2013.01); *E05Y 2400/54* (2013.01); *E05Y 2400/66* (2013.01); *E05Y 2900/546* (2013.01)

(58) Field of Classification Search
CPC . E05F 15/40; E05F 15/77; E05F 15/70; E05F 15/73; B60J 5/101; B60R 25/01; B60R 25/24; B60R 25/10; B60R 25/34; E05Y 2400/54; E05Y 2400/66; E05Y 2900/546; E05Y 2900/548; E05Y 2900/531; B60K 28/12

See application file for complete search history.

(56) References Cited

U.S. PATENT DOCUMENTS

| 6,226,389 B1 * | 5/2001 | Lemelson ............. G01S 13/867 382/104 |
| 9,830,754 B2 * | 11/2017 | Kim ........................ B60R 25/24 |
| 2014/0009264 A1 * | 1/2014 | Song ...................... G08C 19/00 340/5.2 |
| 2014/0156112 A1 * | 6/2014 | Lee ......................... G08C 17/00 701/2 |

(Continued)

*Primary Examiner* — Mussa A Shaawat
(74) *Attorney, Agent, or Firm* — Morgan, Lewis & Bockius LLP

(57) ABSTRACT

A vehicle that can effectively prevent a collision between the tail gate and an obstacle in the situation where the tail gate is automatically opened or closed includes: a tail gate; a driving unit engaged to the tail gate and configured to open or close the tail gate; a UWB module configured to communicate with a smart key according to an authentication signal transmitted from the smart key in a first mode, and transmit a detection signal to an object and detect the object according to the detection signal reflected from the object in a second mode; and a controller connected to the UWB module and configured to operate the UWB module in the second mode when the driving unit operates, and stop the operation of the driving unit when the object is detected from the UWB module operating in the second mode during operation of the driving unit.

19 Claims, 5 Drawing Sheets

(56) References Cited

U.S. PATENT DOCUMENTS

| | | | |
|---|---|---|---|
| 2015/0302737 A1* | 10/2015 | Geerlings | G08C 17/02 340/5.25 |
| 2016/0121849 A1* | 5/2016 | Kim | B60R 25/24 701/2 |
| 2018/0208187 A1* | 7/2018 | Lewis | B60D 1/62 |
| 2019/0249479 A1* | 8/2019 | Lewis | B62D 33/0273 |

* cited by examiner

VEHICLE AND CONTROL METHOD THEREOF

CROSS-REFERENCE TO RELATED APPLICATION

The present application claims priority to Korean Patent Application No. 10-2020-0103494, filed on Aug. 18, 2020 in the Korean Intellectual Property Office, the entire contents of which is incorporated herein for all purposes by this reference.

BACKGROUND OF THE INVENTION

Field of the Invention

The present invention relates to a vehicle and a control method thereof, and more particularly, to a vehicle capable of preventing collision between a tail gate and an obstacle, and a control method thereof.

Description of Related Art

In general, a vehicle refers to a transportation device that travels on a road or track using fossil fuel, electricity, or the like as a power source.

Recently, to increase the convenience of vehicle use, there is an increasing trend of automatically opening and closing the tail gate of a vehicle.

However, when the tail gate of the vehicle is automatically opened and closed, a portion of the user's body or an object collides with the tail gate, causing an accident.

The information included in this Background of the present invention section is only for enhancement of understanding of the general background of the present invention and may not be taken as an acknowledgement or any form of suggestion that this information forms the prior art already known to a person skilled in the art.

BRIEF SUMMARY

Various aspects of the present invention are directed to providing a vehicle configured for preventing collision between a tail gate and an obstacle by use of a Ultra Wide Band (UWB) module provided in a tail gate, and a control method thereof.

In accordance with one aspect of the present invention, a vehicle includes: a tail gate; a driving unit engaged to the tail gate and configured to open or close the tail gate; a UWB module configured to communicate with a smart key according to an authentication signal transmitted from the smart key in a first mode, and transmit a detection signal to an object and detect the object according to the detection signal reflected from the object in a second mode; and a controller connected to the UWB module and configured to operate the UWB module in the second mode when the driving unit operates, and stop the operation of the driving unit when the object is detected from the UWB module operating in the second mode during operation of the driving unit.

The controller may be configured to resume the operation of the driving unit when a preset time elapses from a time in which the operation of the driving unit is stopped and the object is not detected from the UWB module.

The driving unit may be configured to open the tail gate to a preset position in a response to a command for opening the tail gate, and the controller may be configured to change the preset position when a preset time elapses from a time in which the operation of the driving unit is stopped and the object detected from the UWB module is determined as the smart key.

The controller may be configured to operate the UWB module in the first mode upon determining that the driving unit does not operate.

The controller is configured to operate the driving unit according to a control command received from the smart key through the UWB module operating in the first mode.

The controller may be configured to stop the operation of the driving unit when the object detected from the UWB module operating in the second mode is located within a preset distance from the UWB module.

The UWB module may be provided on the tail gate.

The UWB module operating in the second mode may have a detection area passing through the glass portion of the tail gate.

The detection area of the UWB module operating in the second mode may be changed according to the degree of opening and closing of the tail gate.

In accordance with another aspect of the present invention, a control method of a vehicle including a tail gate, a driving unit engaged to the tail gate and configured to open or close the tail gate and a UWB module configured to communicate with a smart key according to an authentication signal transmitted from the smart key in a first mode, and transmit a detection signal to an object and detect the object based on the detection signal reflected from the object in a second mode, the method includes: operating the UWB module in the second mode upon determining that the driving unit operates; and stopping the operation of the driving unit when the object is detected from the UWB module operating in the second mode during operation of the driving unit.

The control method may further include: resuming the operation of the driving unit when a preset time elapses from a time in which the operation of the driving unit is stopped and the object is not detected from the UWB module.

The driving unit may be configured to open the tail gate to a preset position in a response to a command for opening the tail gate, and the method may further include: changing the preset position when a preset time elapses from a time in which the operation of the driving unit is stopped and the object detected from the UWB module is determined as the smart key.

The control method may further include: operating the UWB module in the first mode upon determining that the driving unit does not operate.

The control method may further include: operating the driving unit based on a control command received from the smart key through the UWB module operating in the first mode.

The stopping the operation of the driving unit when the object is detected may include: stopping the operation of the driving unit when the object detected from the UWB module operating in the second mode is located within a preset distance from the UWB module.

The UWB module may be provided on the tail gate.

The UWB module operating in the second mode may have a detection area passing through the glass portion of the tail gate.

The detection area of the UWB module operating in the second mode may be changed according to the degree of opening and closing of the tail gate.

The methods and apparatuses of the present invention have other features and advantages which will be apparent from or are set forth in more detail in the accompanying drawings, which are incorporated herein, and the following Detailed Description, which together serve to explain certain principles of the present invention.

Figure 1:
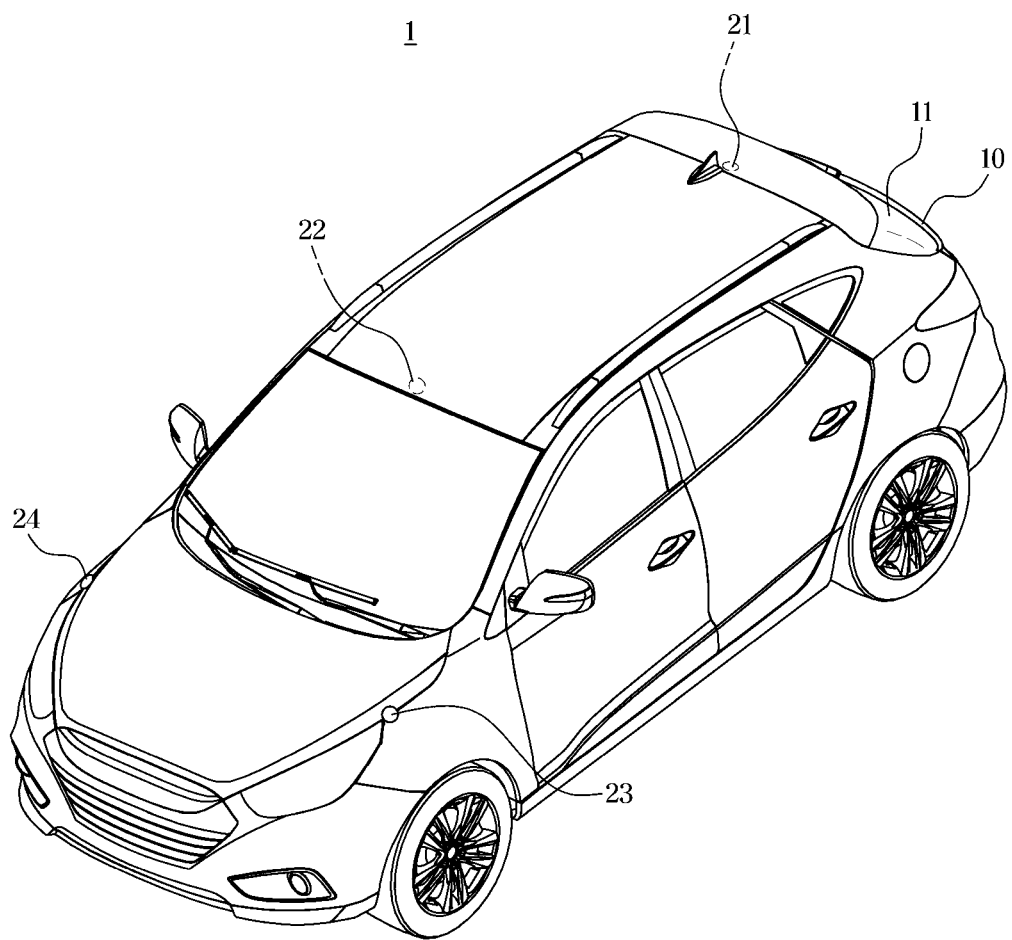
FIG. 1 is an external view of a vehicle according to various exemplary embodiments of the present invention.

It may be understood that the appended drawings are not necessarily to scale, presenting a somewhat simplified representation of various features illustrative of the basic principles of the present invention. The specific design features of the present invention as included herein, including, for example, specific dimensions, orientations, locations, and shapes will be determined in part by the particularly intended application and use environment.

In the figures, reference numbers refer to the same or equivalent portions of the present invention throughout the several figures of the drawing.

DETAILED DESCRIPTION

Reference will now be made in detail to various embodiments of the present invention(s), examples of which are illustrated in the accompanying drawings and described below. While the present invention(s) will be described in conjunction with exemplary embodiments of the present invention, it will be understood that the present description is not intended to limit the present invention(s) to those exemplary embodiments. On the other hand, the present invention(s) is/are intended to cover not only the exemplary embodiments of the present invention, but also various alternatives, modifications, equivalents and other embodiments, which may be included within the spirit and scope of the present invention as defined by the appended claims.

Advantages and features of the disclosed invention, as well as a method and apparatus configured for achieving them, will become apparent with reference to the exemplary embodiments described below with reference to the accompanying drawings. However, the disclosed invention is not limited to the exemplary embodiments disclosed below and may be implemented in various different forms. Only the disclosed exemplary embodiments are provided to complete the present invention of the disclosed invention, and to fully inform the scope of the present invention to those of ordinary skill in the art to which the disclosed invention belongs. The disclosed invention is only defined by the scope of the claims.

The terms used in the disclosed specification will be briefly described, and the disclosed invention will be described in detail.

As for terms used in the disclosed invention, general terms that are currently widely used as possible are selected while considering functions in the disclosed invention, but this may vary according to the intention or judicial precedent of a person skilled in the art, the emergence of new technologies, and the like. In addition, in certain cases, there are terms arbitrarily selected by the applicant, and in this case, the meaning of the terms will be described in detail in the description of the corresponding invention. Therefore, the terms used in the disclosed invention should be defined based on the meaning of the term and the overall contents of the disclosed invention and not a simple name of the term.

When a portion of the specification "includes" a certain component, it means that other components may be further included rather than excluding other components unless otherwise stated. Furthermore, the term 'part, module, member, block, unit' used in the specification refers to a software and a hardware component such as Field-Programmable Gate Array (FPGA), or Application Specific Integrated Circuit (ASIC), and the 'part, module, member, block, unit' may perform certain roles. However, 'part, module, member, block, unit' are not meant to be limited to software or hardware. The 'part, module, member, block, unit' may be configured to be in an addressable storage medium or may be configured to reproduce one or more processors. Thus, as an example, 'part, module, member, block, unit' may include components such as software components, object-oriented software components, class components, and task components, processes, functions, properties, procedures, subroutines, segments of program code, drivers, firmware, microcode, circuitry, data, database, data structures, tables, arrays and variables. The functions provided within the components and 'part, module, member, block, unit' may be combined into a smaller number of components and 'parts, modules, members, blocks, units' or may be further separated into additional components and 'parts, modules, members, blocks, units'.

Hereinafter, embodiments of a vehicle and a control method thereof will be described in detail with reference to the accompanying drawings so that those of ordinary skill in the art to which the disclosed invention pertains can easily implement it. In addition, to clearly describe the present invention disclosed in the drawings, parts not related to the description will be omitted. In addition, in the drawings, the same reference numerals denote the same components, and redundant descriptions thereof will be omitted.

In various exemplary embodiments of the present invention, "object" may mean any obstacle which may collide with the tail gate, such as a stationary object, a moving object, a person, or an animal.

Figure 2:
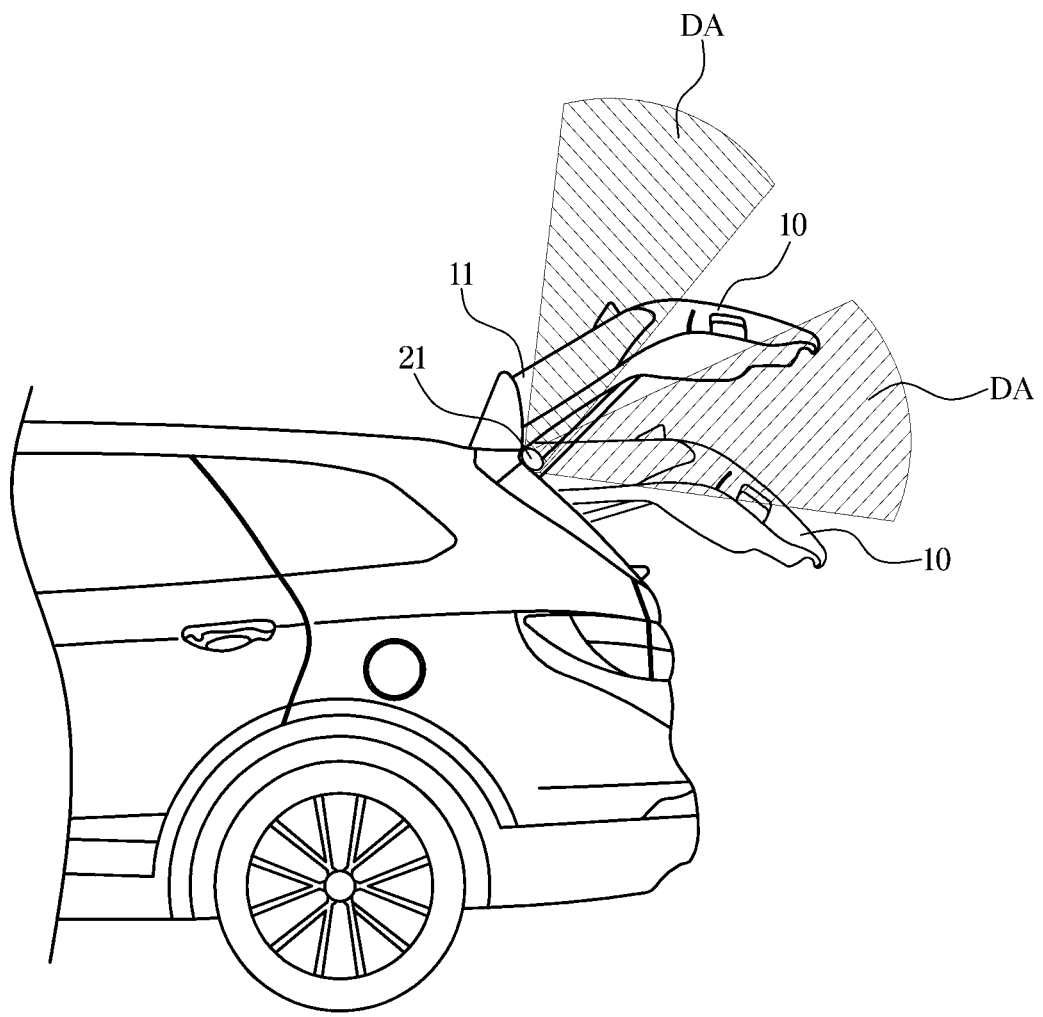
FIG. 2 is an enlarged view of a tail gate portion of a vehicle according to various exemplary embodiments of the present invention.
Figure 3:
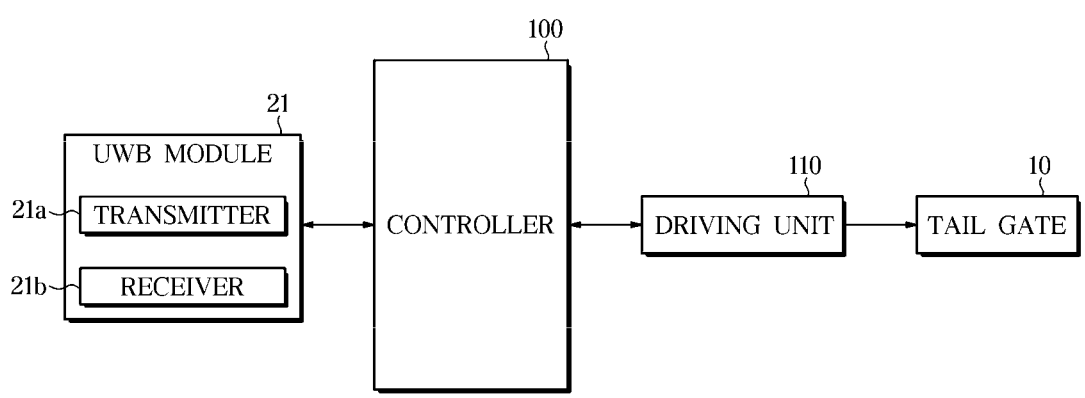
FIG. 3 is a control block diagram of a vehicle according to various exemplary embodiments of the present invention.

FIG. 1 is an external view of a vehicle according to various exemplary embodiments of the present invention. FIG. 2 is an enlarged view of a tail gate portion of a vehicle according to various exemplary embodiments of the present invention. FIG. 3 is a control block diagram of a vehicle according to various exemplary embodiments of the present invention.

Referring to FIG. 1, FIG. 2, and FIG. 3, the vehicle 1 according to various exemplary embodiments of the present invention may include a tail gate 10 shielding the interior of the vehicle body from the outside thereof or communicating the interior of the vehicle body with the outside and a plurality of Ultra Wide Band (UWB) modules 21, 22, 23 and 24.

UWB modules 21, 22, 23 and 24 according to various exemplary embodiments of the present invention may include outdoor UWB modules 23 and 24 provided outside of vehicle 1 and indoor UWB modules 21 and 22 provided inside of vehicle 1.

However, the number and location of the UWB modules 21, 22, 23 and 24 are not limited thereto, and fewer or more UWB modules may be provided at various locations of the vehicle 1 according to the specifications or performance of the vehicle 1.

Hereinafter, the UWB module 21 provided in the tail gate 10 will be described in detail, but other UWB modules 22, 23, 24 also may include the same configuration as the UWB module 21 provided in the tail gate 10 and may perform the same function.

The UWB module 21 according to various exemplary embodiments of the present invention is provided in the tail gate 10 and may include a transmitter 21a and a receiver 21b.

The UWB module 21 may be attached to the tail gate 10 and provided inside the vehicle 1. However, the mounting position of the UWB module 21 is not limited thereto, and any position configured for moving together according to the movement of the tail gate 10 may be employed without limitation.

For example, the UWB module 21 may be attached on the tail gate 10 to be provided outside the vehicle 1, or may be provided at the lower end portion of the glass 11 portion of the tail gate 10.

The transmitter 21a may transmit a first UWB signal (hereinafter referred to as 'authentication signal') for communicating with the smart key of the vehicle 1 and a second UWB signal (hereinafter referred to as 'detection signal') for detecting an object. Both the authentication signal and the detection signal may be signals generated based on the UWB impulse signal.

The authentication signal and the detection signal transmitted by the transmitter 21a may be signals of different frequency bands, and may be transmitted through different transmission channels.

Also, the transmitter 21a may transmit an authentication signal in all directions and may transmit a detection signal in a direction concentrated in the detection area DA.

Referring to FIG. 2, the detection area DA of the UWB module 21 may be changed according to the degree of opening and closing of the tail gate 10. Since the UWB module 21 is provided on the tail gate 10, it moves together according to the movement of the tail gate 10. Accordingly, the detection area DA of the UWB module 21 may be changed according to the movement of the tail gate 10.

When the UWB module 21 is provided in the tail gate 10 on the internal side of the vehicle 1, the detection signal transmitted from the transmitter 21a can pass through the glass 11 of the tail gate 10, but cannot pass through the metal portion of the tail gate 10. Accordingly, the UWB module 21 may have a detection area DA that passes through the glass 11 of the tail gate 10.

The smart key of the vehicle 1 is a device having a communication module configured for transmitting an authentication signal corresponding to the vehicle 1, and may include the FOB key of the vehicle 1 or a user terminal. The user terminal may be interlocked with the vehicle 1 through communication with the vehicle 1, and may include a portable terminal configured for accessing the vehicle 1 through a network. For example, the user terminal may include all kinds of handheld-based wireless communication devices such as a smart phone, and a wearable device such as a watch, a ring, a bracelet, an anklets, a necklace, glasses, a contact lens, or a head-mounted-device (HMD).

The receiver 21b may include a first antenna configured for receiving an authentication signal transmitted from the smart key of the vehicle 1. For example, the authentication signal transmitted from the smart key may include a UWB signal, and the first antenna may include a UWB antenna.

The first antenna may receive an authentication signal transmitted from a transponder of the smart key. In the instant case, the controller 100 may determine a distance between the smart key and the UWB communication module based on the strength of the authentication signal received from the first antenna.

Furthermore, the controller 100 may determine the location of the smart key using a Time of Flight (ToF) method with respect to the authentication signal received from the first antenna. Furthermore, the controller 100 may determine the location of the smart key using a Time of Arrival (TOA), Time Difference of Arrival (TDOA), Angle of Arrival (AOA), or Received Signal Strength Indicator (RSSI) method.

When using the first antenna included in the plurality of UWB modules 21, 22, 23 and 24, the controller 100 may determine not only the distance between the vehicle 1 and the smart key, but also the precise location of the smart key. For example, when using the first antenna included in three UWB modules (three of 21, 22, 23 and 24), the controller 100 may determine the distance between each UWB module (three of 21, 22, 23 and 24) and the smart key based on the authentication signal received from each of the three receivers, and may determine the precise location of the smart key based on the distance between each of the UWB modules (three of 21, 22, 23 and 24) and the smart key.

The controller 100 may control various components of the vehicle 1 based on the position of the smart key. For example, when a smart key is detected during a preset time in the vicinity of the tail gate 10 of the vehicle 1, the controller 100 may open the tail gate 10 by controlling the driving unit 110 that opens and closes the tail gate 10.

The receiver 21b may include a second antenna for receiving the detection signal reflected from the object when the detection signal transmitted from the transmitter 21a is reflected from the object. In the instant case, the second antenna may include a UWB antenna.

The second antenna may receive a detection signal (hereinafter referred to as 'reflection signal') reflected from the object, and the controller 100 may determine the distance between the object and the UWB module 21 based on the reflected signal received from the second antenna.

Although not shown in the drawing, the UWB communication module may include a switching unit, and the switching unit may selectively employ a first antenna or a second antenna based on a control signal of the controller 100. For example, when the switching unit employs the first antenna, the receiver 21b may receive the authentication signal transmitted from the smart key, and when the switching unit employs the second antenna, the receiver 21b may receive a detection signal reflected from the object.

The first antenna and the second antenna may be implemented as one integrated antenna configured to receive both an authentication signal from a smart key and a detection signal reflected from an object.

That is, the receiver 21b may be implemented as one integrated antenna instead of the first antenna and the second antenna.

The UWB module 21 described above may operate in a first mode communicating with the smart key based on the authentication signal transmitted from the smart key according to the control signal of the controller 100 or may operate in a second mode of transmitting a detection signal to an object and detecting an object based on a detection signal reflected from the object.

The driving unit 110 according to various exemplary embodiments of the present invention may include an actuator that opens and closes the tail gate 10 based on a control signal from the controller 100.

The driving unit 110 may include a driving motor that generates a driving force for opening or closing the tail gate 10 and a driving circuit that supplies driving power to the driving motor according to a control signal from the controller 100.

The driving motor may receive driving power from a driving circuit and convert the supplied driving power into rotational force. Furthermore, the tail gate 10 may be opened or closed by the converted rotational force.

For example, the rotational force generated by the driving motor may be transmitted to the tail gate 10 through a gear or the like. In other words, the drive motor may open or close the tail gate 10 through a gear or the like.

As various exemplary embodiments of the present invention, the rotational force generated by the driving motor may be transmitted to the tail gate 10 through a fluid and a piston. In other words, the driving motor may open or close the tail gate 10 through a piston or the like.

The driving circuit may supply driving power to open the tail gate 10 or supply driving power to close the tail gate 10 to the driving motor according to a control signal of the controller 100. For example, the driving circuit may supply a positive driving current to the driving motor to close the tail gate 10 and may supply a negative driving current to the driving motor to open the tail gate 10.

Such a driving circuit may include a switching element such as a relay for supplying driving power to the driving motor or blocking driving power, or an inverter circuit for controlling the opening speed or closing speed of the tail gate 10.

The driving unit 110 may receive a command for opening the tail gate 10 from the controller 100 and may open the tail gate 10 to a preset position in a response to the open command. That is, the opening amount of the tail gate 10 may be preset and stored in the memory of the controller 100.

The controller 100 according to various exemplary embodiments of the present invention may operate the UWB module 21 in a first mode or a second mode based on whether the driving unit 110 is operated. The controller 100 may operate the UWB module 21 in the second mode when the driving unit 110 operates. For example, the controller 100 may control the transmitter 21a to transmit a detection signal to the detection area DA when the driving unit 110 operates, and may enable the receiver 21b to receive the reflected signal by controlling the switching unit and employing a second antenna.

Furthermore, the controller 100 may operate the UWB module 21 in the first mode when the driving unit 110 does not operate. For example, the controller 100 may control the transmitter 21a to transmit an authentication signal in all directions when the driving unit 110 does not operate, and may enable the receiver 21b to receive the authentication signal transmitted from the smart key by controlling the switching unit and employing a first antenna.

The controller 100 for performing the above-described operation or an operation to be described later may be implemented as at least one memory that stores an algorithm for controlling the operation of components in the vehicle 1 or data for a program that reproduces the algorithm, and at least one processor that performs the above-described operation using data stored in at least one memory. In the instant case, at least one memory and at least one processor may be implemented as separate chips, respectively. Alternatively, the memory and processor may be implemented as a single chip.

In the above, the components of the vehicle 1 according to an exemplary embodiment have been described. Various components included in the vehicle 1 can communicate with each other through a communication network for the vehicle. Vehicle communication networks may adopt a communication protocol such as Media Oriented Systems Transport (MOST) with a maximum communication speed of 24.5 Mbps, FlexRay with a maximum communication speed of 10 Mbps, Controller Area Network (CAN) having a communication speed of 125 kbps to 1 Mbps, and Local Interconnect Network (LIN) having a communication speed of 20 kbps. The vehicle communication network can adopt a single communication protocol such as MOST, FlexRay, CAN, and LIN, as well as a plurality of communication protocols.

At least one component may be added or deleted in a response to the performance of the components described above. Furthermore, it will be readily understood by those of ordinary skill in the art that the mutual positions of the components may be changed in a response to the performance or structure of the system.

Figure 4:
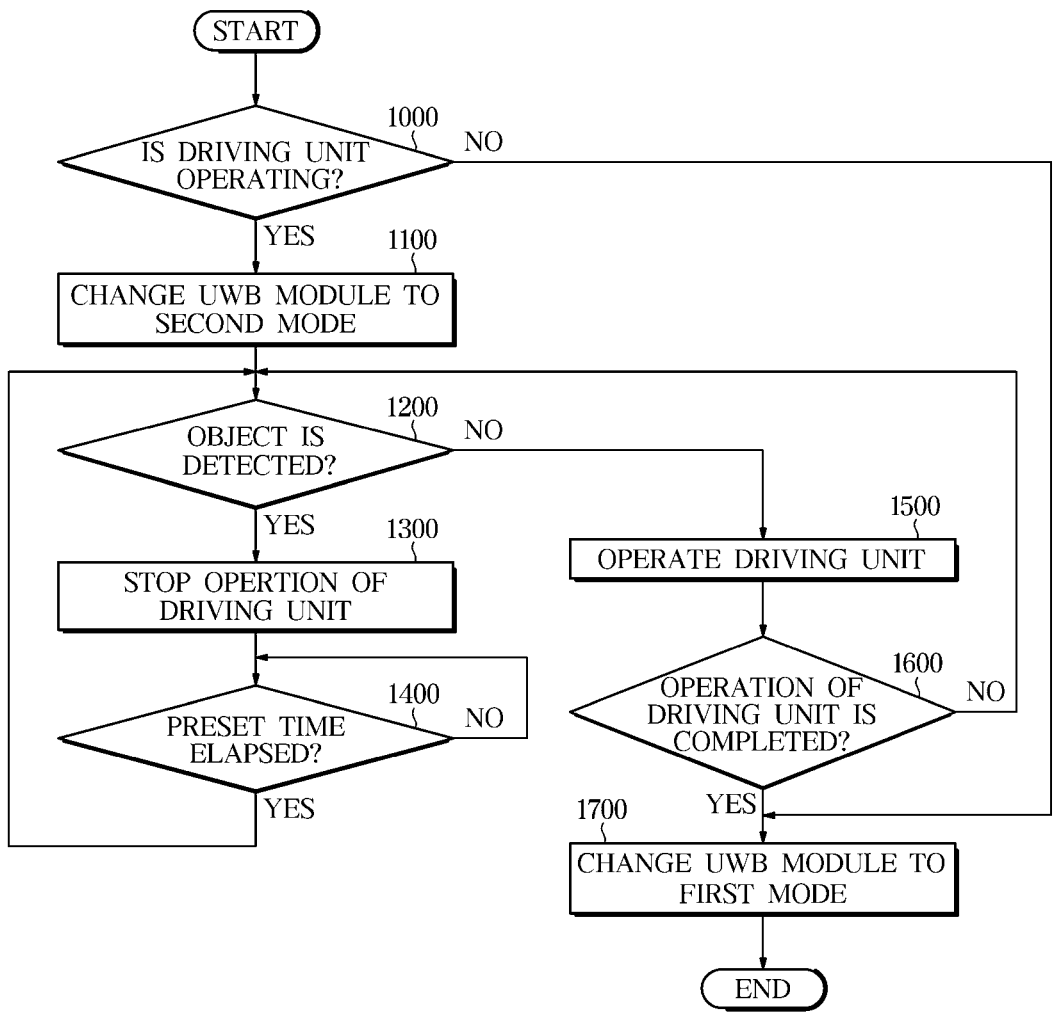
FIG. 4 is a flowchart of a control method of a vehicle according to various exemplary embodiments of the present invention.
Figure 5:
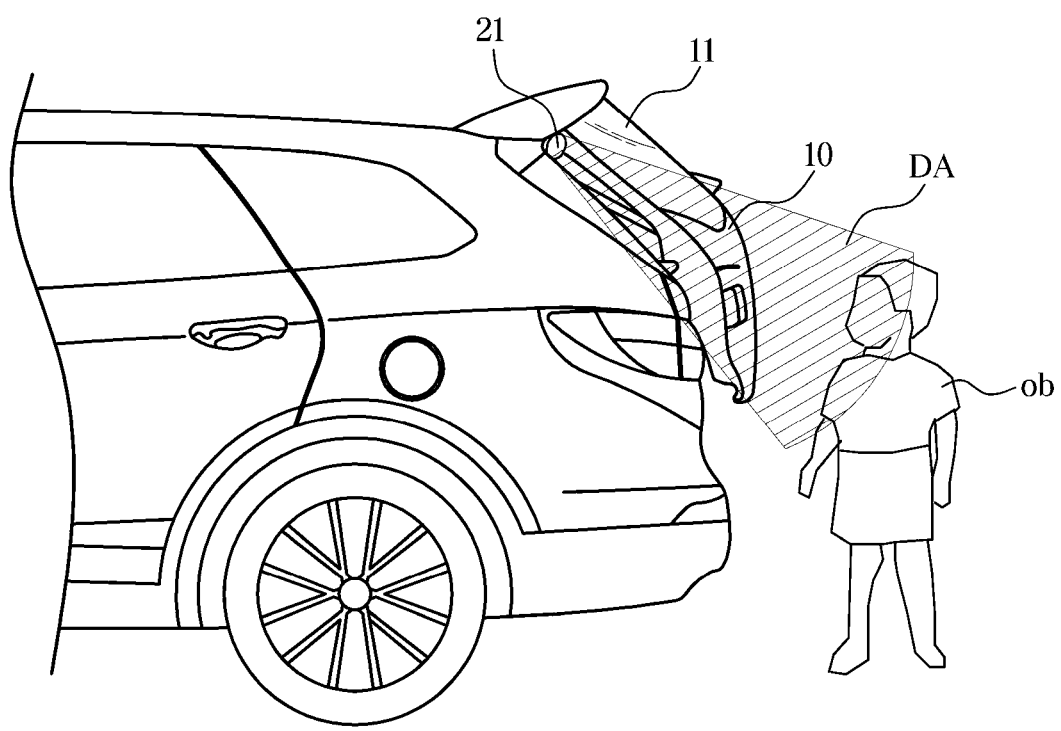
FIG. 5 is a diagram illustrating a situation in which an object is detected by a UWB module according to various exemplary embodiments of the present invention.

Hereinafter, a control method of the vehicle 1 according to an exemplary embodiment will be described with reference to FIG. 4. FIG. 4 is a flowchart of a control method of a vehicle according to various exemplary embodiments of the present invention. FIG. 5 is a diagram illustrating a situation in which an object is detected by a UWB module according to various exemplary embodiments of the present invention.

Referring to FIG. 4, the controller 100 according to various exemplary embodiments of the present invention may determine whether the driving unit 110 is operating (1000). In various situations, such as when a user inputs an open command or a close command of the tail gate 10 using an input device provided in the vehicle 1, when the UWB module 21 operating in the first mode communicates with the smart key and receives a control command such as an open command or a close command of the tail gate 10, and when the position of the smart key determined based on the authentication signal received from the UWB modules 21 operating in the first mode exists in the preset position during the preset time, the driving unit 110 may be operated according to a control command of the controller 100.

When the driving unit 110 does not operate (NO in 1000), the controller 100 may operate the UWB module 21 in the first mode (1700).

In other words, when the tail gate 10 is being opened or not being closed based on the driving force provided by the driving unit 110, the controller 100 may operate the UWB module 21 in the first mode.

When the driving unit 110 operates and thereby the tail gate 10 is being opened or closed (YES in 1000), the controller 100 may operate the UWB module 21 in the second mode (1100).

In the UWB module 21 operating in the second mode, the detection area DA may be changed according to the opening or closing of the tail gate 10.

Referring to FIG. 5, the detection area DA of the UWB module 21 may always be an upper area of the tail gate 10. That is, the detection area DA of the UWB module 21 may be raised as the tail gate 10 is opened, and accordingly, the object ob existing at the upper end portion of the tail gate 10 may be detected. Conversely, the detection area DA of the UWB module 21 may be lowered as the tail gate 10 is closed.

The UWB module 21 may transmit a detection signal to an object ob existing in the detection area DA based on a control signal of the controller 100 and receive a detection signal reflected from the object ob. The controller 100 may detect an object ob existing in the detection area DA of the UWB module 21 based on the reflected signal received from the UWB module 21 (1200).

Since the detection area DA of the UWB module 21 is an upper area of the tail gate 10, the UWB module 21 may detect an object ob which may collide with the tail gate 10 before the tail gate 10 is opened and collides with the object ob.

When an object ob is detected from the UWB module 21 during the operation of the driving unit 110, the controller 100 may stop the operation of the driving unit 110 (1300). For example, when an object ob is detected from the UWB module 21 while the driving unit 110 opens the tail gate 10, the controller 100 may stop opening of the tail gate 10 by stopping the operation of the driving unit 110.

For example, the controller 100 may stop the operation of the driving unit 110 when the object ob detected by the UWB module 21 is located within a preset distance from the UWB module. In the instant case, the preset distance may be greater than the length of the tail gate 10 and may be stored in the memory of the controller 100.

When the UWB module 21 is provided on the upper end portion of the tail gate 10, if the distance between the UWB module 21 and the object ob is within a preset distance, the possibility of collision between the open or closed tail gate 10 and the object ob is high. Therefore, the collision between the tail gate 10 and the object ob may be prevented by stopping the operation of the driving unit 110.

Furthermore, as the UWB module 21 moves together with the tail gate 10, the detection area DA of the UWB module 21 may always face the upper or lower end portion of the tail gate 10. Accordingly, it is possible to determine the presence or absence of the object ob prior to the movement of the tail gate 10, and it is possible to effectively prevent a collision between the tail gate 10 and the object ob.

If the preset time has elapsed from the point in time when the operation of the driving unit 110 is stopped (YES in 1400) and no object ob is detected from the UWB module 21 (No in 1200), the controller 100 may determine that the object ob obstructing the opening or closing of the tail gate 10 has disappeared and may resume the operation of the driving unit 110 (1500).

As described above, the driving unit 110 may open the tail gate 10 to a preset position in a response to an open command of the tail gate 10 received from the controller 100.

For example, the controller 100 may adjust the opening amount of the tail gate 10 by adjusting the amount of current applied to the driving motor of the driving unit 110, and the amount of current applied to the driving motor may be previously stored in the memory.

Although not shown in the drawing, when the preset time has elapsed from the point in time when the operation of the driving unit 110 is stopped (YES in 1400), and an object ob is detected from the UWB module 21 (YES in 1200), the controller 100 may determine that the user sets the opening amount of the tail gate 10 and store the current opening amount of the tail gate 10 in the memory.

The controller 100 may determine the location of the smart key according to signals received from other UWB modules 22, 23 and 24 operating in the first mode. Furthermore, when the object ob detected by the UWB module 21 operating in the second mode is determined to be a smart key, the controller 100 may determine that the user sets the opening amount of the tail gate 10 and store the current opening amount of the tail gate 10 in the memory.

That is, the user can easily set the opening amount of the tail gate 10 by placing the smart key in the opening radius of the tail gate 10.

The degree of opening of the tail gate 10 may be determined based on the amount of current applied to the driving unit 110 from the point in time when the driving unit 110 operates to the point in time when the operation of the driving unit 110 is stopped.

When the tail gate 10 is closed after the degree of opening of the tail gate 10 is stored in the memory, the controller 100 may control the driving unit 110 based on the degree of opening of the tail gate 10 stored in the memory when the opening condition of the tail gate 10 is satisfied.

In other words, the driving unit 110 may open the tail gate 10 to a preset position in a response to an open command of the tail gate 10, and the controller 100 may change the preset position when the preset time elapses from the point in time when the operation of the driving unit 110 is stopped and the object ob detected by the UWB module 21 is determined to be a smart key.

When the driving unit 110 opens the tail gate 10 to the preset position, that is, when the operation of the driving unit 110 is completed (YES in 1600), the controller 100 may operate the UWB module 21 in the first mode (1700).

According to the disclosed embodiment, the UWB module 21 may be used efficiently by detecting the location of the smart key by utilizing the UWB module 21 in a first module when the driving unit 110 does not operate and by preventing the collision between the tail gate 10 and the object ob by utilizing the UWB module 21 in the second mode when the driving unit 110 operates.

Furthermore, according to the disclosed embodiment, the detection area DA of the UWB module 21 operating in the second mode is changed according to the opening and closing of the tail gate 10, effectively preventing collisions between the tail gate 10 and the object ob.

Meanwhile, some components of the vehicle 1 may be software and/or hardware components such as Field Programmable Gate Array (FPGA) and Application Specific Integrated Circuit (ASIC).

According to various exemplary embodiments of the present invention, it is possible to improve the usability of the UWB module by detecting an obstacle using the UWB module in a situation in which the tail gate is automatically opened and closed.

Furthermore, according to various exemplary embodiments of the present invention, it is possible to effectively prevent a collision between a tail gate and an obstacle in a situation in which the tail gate is automatically opened and closed.

On the other hand, the disclosed exemplary embodiments may be implemented in a form of a recording medium for storing instructions executable by a computer. Instructions may be stored in a form of program code, and when executed by a processor, may generate a program module to perform the operations of the disclosed exemplary embodiments. The recording medium may be implemented as a computer-readable recording medium.

The computer-readable recording medium includes all kinds of recording media in which instructions which may be decoded by a computer. For example, there may be read only memory (ROM), random access memory (RAM), a magnetic tape, a magnetic disk, a flash memory, an optical data storage device, and the like.

For convenience in explanation and accurate definition in the appended claims, the terms "upper", "lower", "inner", "outer", "up", "down", "upwards", "downwards", "front", "rear", "back", "inside", "outside", "inwardly", "outwardly", "interior", "exterior", "internal", "external", "forwards", and "backwards" are used to describe features of the exemplary embodiments with reference to the positions of such features as displayed in the figures. It will be further understood that the term "connect" or its derivatives refer both to direct and indirect connection.

The foregoing descriptions of specific exemplary embodiments of the present invention have been presented for purposes of illustration and description. They are not intended to be exhaustive or to limit the present invention to the precise forms disclosed, and obviously many modifications and variations are possible in light of the above teachings. The exemplary embodiments were chosen and described to explain certain principles of the present invention and their practical application, to enable others skilled in the art to make and utilize various exemplary embodiments of the present invention, as well as various alternatives and modifications thereof. It is intended that the scope of the present invention be defined by the Claims appended hereto and their equivalents.

What is claimed is:

1. A vehicle comprising:
   a tail gate;
   a driving unit engaged to the tail gate and configured to open or close the tail gate;
   a Ultra Wide Band (UWB) module configured to:
      communicate with a smart key according to an authentication signal transmitted from the smart key in a first mode, and
      transmit a detection signal to an object and detect the object according to the detection signal reflected from the object in a second mode; and
   a controller connected to the UWB module and configured to operate the UWB module in the second mode when the driving unit operates, and to stop the operation of the driving unit when the object is detected from the UWB module operating in the second mode during operation of the driving unit,
   wherein the controller is determine a location of the smart key according to signals received from the UWB module operating in the first mode, and when the object detected by the UWB module operating in the second mode is determined to be the smart key, the controller is determine that a user sets an opening amount of the tail gate.

2. The vehicle according to claim 1, wherein the controller is configured to resume the operation of the driving unit when a preset time elapses from a time in which the operation of the driving unit is stopped and the object is not detected from the UWB module.

3. The vehicle according to claim 1,
   wherein the driving unit is configured to open the tail gate to a preset position in a response to a command for opening the tail gate, and
   wherein the controller is configured to change the preset position when a preset time elapses from a time in which the operation of the driving unit is stopped and the object detected from the UWB module is determined as the smart key.

4. The vehicle according to claim 1, wherein the controller is configured to operate the UWB module in the first mode upon determining that the driving unit does not operate.

5. The vehicle according to claim 4, wherein the controller is configured to operate the driving unit according to a control command received from the smart key through the UWB module operating in the first mode.

6. The vehicle according to claim 1, wherein the controller is configured to stop the operation of the driving unit when the object detected from the UWB module operating in the second mode is located within a preset distance from the UWB module.

7. The vehicle according to claim 1, wherein the UWB module is provided on the tail gate.

8. The vehicle according to claim 6, wherein the UWB module operating in the second mode has a detection area passing through a glass portion of the tail gate.

9. The vehicle according to claim 1, wherein a detection area of the UWB module operating in the second mode is changed according to a degree of opening or closing of the tail gate.

10. A control method of a vehicle including a tail gate, a driving unit engaged to the tail gate and configured to open or close the tail gate and a Ultra Wide Band (UWB) module configured to communicate with a smart key according to an authentication signal transmitted from the smart key in a first mode, and to transmit a detection signal to an object and detect the object according to the detection signal reflected from the object in a second mode, the method comprising:
    operating, by a controller connected to the UWB module, the UWB module in the second mode upon determining that the driving unit operates;
    stopping the operation of the driving unit when the object is detected from the UWB module operating in the second mode during operation of the driving unit; and
    determining a location of the smart key according to signals received from the UWB module operating in the first mode,
    wherein when the object detected by the UWB module operating in the second mode is determined to be the smart key, the controller is determine that a user sets an opening amount of the tail gate.

11. The control method according to claim 10, further including:
    resuming the operation of the driving unit when a preset time elapses from a time in which the operation of the driving unit is stopped and the object is not detected from the UWB module.

12. The control method according to claim 10, wherein the driving unit is configured to open the tail gate to a preset position in a response to a command for opening the tail gate.

13. The control method according to claim 12, further including:
    changing the preset position when a preset time elapses from a time in which the operation of the driving unit is stopped and the object detected from the UWB module is determined as the smart key.

14. The control method according to claim 10, further including:
    operating the UWB module in the first mode upon determining that the driving unit does not operate.

15. The control method according to claim 14, further including:
    operating the driving unit according to a control command received from the smart key through the UWB module operating in the first mode.

16. The control method according to claim 10, wherein the stopping the operation of the driving unit when the object is detected includes:
- stopping the operation of the driving unit when the object detected from the UWB module operating in the second mode is located within a preset distance from the UWB module.

17. The control method according to claim 10, wherein the UWB module is provided on the tail gate.

18. The control method according to claim 17, wherein the UWB module operating in the second mode has a detection area passing through a glass portion of the tail gate.

19. The control method according to claim 10, wherein a detection area of the UWB module operating in the second mode is changed according to a degree of opening or closing of the tail gate.

* * * * *